Dec. 2, 1941.   L. A. TAYLOR   2,264,865
CONTROL SYSTEM
Filed May 24, 1939
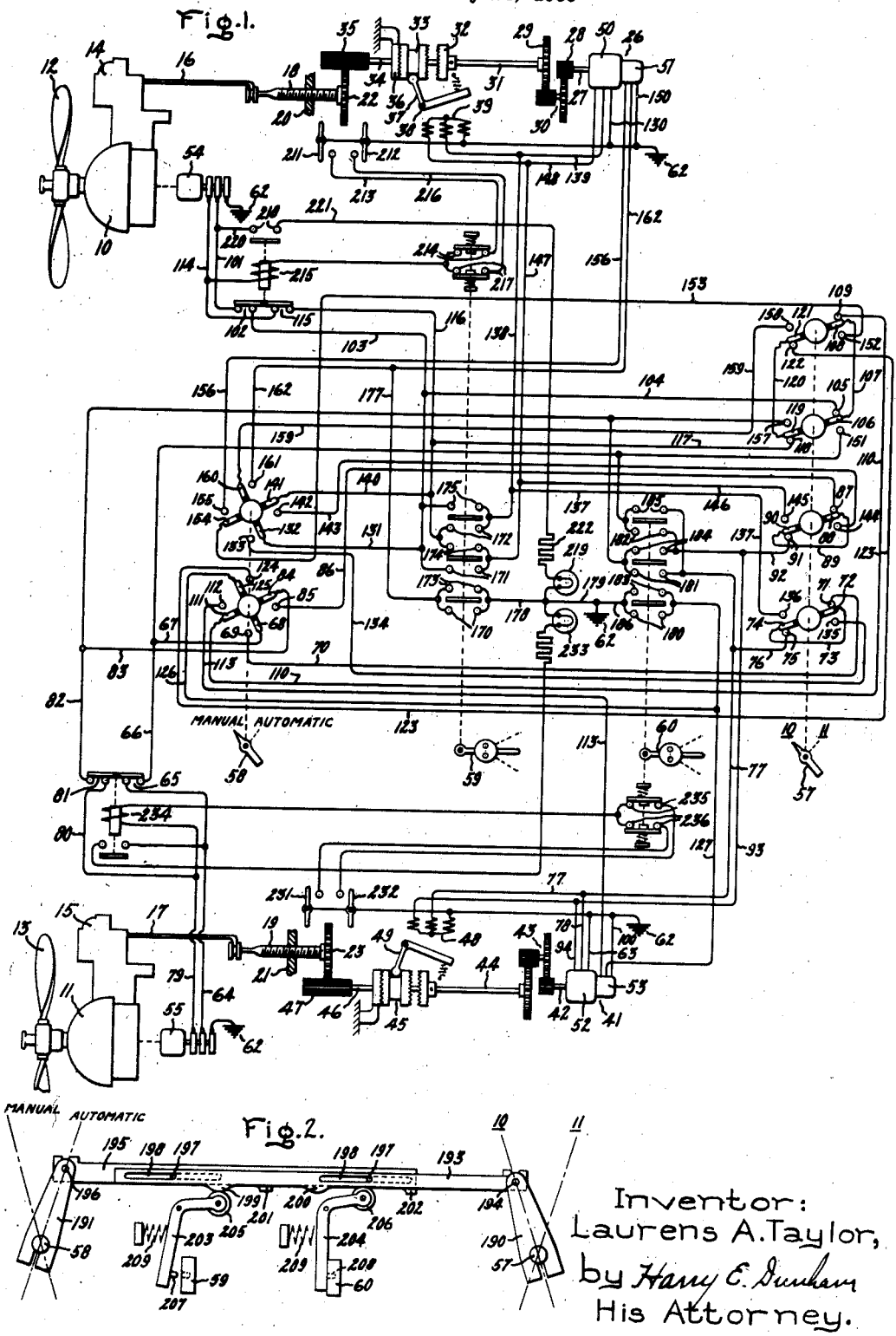
Inventor:
Laurens A. Taylor,
by Harry E. Dunham
His Attorney.

Patented Dec. 2, 1941

2,264,865

UNITED STATES PATENT OFFICE 2,264,865

CONTROL SYSTEM

Laurens A. Taylor, Schenectady, N. Y., assignor to General Electric Company, a corporation of New York Application May 24, 1939, Serial No. 275,401

13 Claims. (Cl. 60—97)

My invention relates to a control system for power plants and more particularly to a speed and synchronizing control system for controlling a plurality of engine-propeller combinations used to furnish propulsive power for a vehicle, such as an airplane.

An object of my invention is the provision of control means for a plurality of power plants arranged so that each power plant may be manually and independently controlled, or one or more of the power plants automatically controlled to obtain synchronous operation of the power plants.

Another object of my invention is the provision, in combination with an adjustable speed controlling means, such as a governor for each power plant, of electrical devices for adjusting the various governors, such electrical devices being capable of operation as electrical differential devices for automatic synchronizing control and as reversible motors for independent manual control of each of the respective power plants.

A further object of my invention is the provision of interlocking means to enable the manual control of a selected one of the power plants by operating its electrical device as an independent reversible motor and for simultaneously rendering impossible such independent manual control of the other electrical devices, when the other electrical devices are operating as differential devices during automatic synchronizing control of their respective power plants.

A still further object of my invention is the provision of control limiting means to render each of the electrical devices inoperative if predetermined control limits in the control exercised over their respective power plants are exceeded, either when the electrical devices are operating as differential devices or as independent manually controlled reversible motors.

Further objects of my invention will become apparent from the following specification, and for a more complete understanding of my invention reference should be had to the accompanying drawing in which Fig. 1 is a schematic wiring diagram of a control system embodying my invention arranged for the control of a pair of power plants; and Fig. 2 is an elevational view of an interlocking device for the switching means.

Referring to the drawing, I have shown my invention in one form as applied to the control of a plurality of power plants, such as a pair of airplane engines 10 and 11, driving respectively the controllable pitch propellers 12 and 13. The engines 10 and 11 may constitute two separate power plants utilized to furnish propulsive power for a single vehicle or airplane. Although I have illustrated a dual power plant or two engine arrangement, it is to be understood that the control system embodying my invention may be extended to effect the control of three, four or more power plants as desired.

As shown, the pitch settings of the variable pitch propellers 12 and 13 are controlled respectively by the engine-driven governors 14 and 15 in a manner well known in the art. For the purposes of this description, it will suffice to say that the governors 14 and 15 may be of the centrifugal flyball type having a speeder spring for loading the flyballs, the loading of this speeder spring being adjustable to change the flyball position for any given engine speed. The flyballs of each governor control the pitch changing mechanism of the corresponding controllable pitch propeller in such a manner as to change the pitch of the propeller to vary the load upon the engine in response to variation in the speed of the engine from a predetermined value, depending upon the adjustment of the speeder spring. Suitable means including the translatable rods 16 and 17 are operatively connected with the speeder springs of the respective governors 14 and 15 for adjusting the setting of the corresponding flyballs. It should now be apparent that translation of either of the rods 16 or 17 will adjust the corresponding governor 14 or 15 by changing the load on its speeder spring and thereby set a different speed for the engine-propeller combination by accordingly altering the pitch of the respective propeller through its pitch changing mechanism.

Suitable movement of the rods 16 and 17 to adjust the governors 14 and 15 is effected through the threaded members 18 and 19 which are movable back and forth relative to their fixed mounting members 20 and 21 upon rotation of the gears 22 and 23 secured on the respective right-hand ends of the threaded members 18 and 19. The gear 22 is rotated in one direction or the other by an electrical motor device 26 whose operation will be more fully described hereinafter. The motor device 26 is connected through the shaft 27 carrying a pinion 28 to a gear 29 through suitable gearing 30. The gear 29 is secured to the right-hand end of a shaft 31 which has secured at its left end a clutch plate 32. A slidable clutch member 33, shown in the disengaged position, may be engaged with the clutch plate 32 for operating or driving a shaft 34 which has secured at its left end a pinion 35 meshed with the gear 22. The shaft 34 is journaled in a fixed member 36 provided with a serrated axial face which engages a similar serrated face on the movable clutch member 33 to act as a brake tending to hold the shaft 34 against rotation when the clutch 33 is disconnected. The movable clutch member 33 may be connected to the shaft 34 by a key and spline and is movable longitudinally from the disengaged position shown into clutching engagement with the clutch plate 32 by an operating member 37 pivoted on a pin 38, the operating member 37 being spring-biased to the position shown and rotatable in a clockwise direction upon energization of the solenoid windings 39. In other words, I have provided a magnetically operable brake and clutch combination which serves to connect and disconnect the electric motor device 26 to the gear 22 for translating the rod 16 back or forth to adjust the speeder spring of the governor 14.

Similarly, an electric motor device 41 serves to drive the gear 23, the threaded member 19 and the governor speeder-spring adjusting rod 17 through a shaft 42, the gearing 43, a shaft 44, the clutch and brake members 45, a shaft 46 and a pinion 47 meshed with the gear 23. Also, the solenoid windings 48 are provided for magnetically operating an actuating arm 49 operatively to engage the clutch 45 when the solenoid windings 48 are energized. In this manner, and as will be more fully described hereinafter, the rotational forces of the electric motor devices 26 and 41 are directly transmitted for adjusting the respective governors 14 and 15 and thereby the speed of the engines 10 and 11.

The electric motor devices 26 and 41 are each provided with separately energizable stator and rotor windings which, as shown, comprise the poly-circuit stator 50 and the poly-circuit rotor 51 of the electrical motor device 26 and the poly-circuit stator 52 and the poly-circuit rotor 53 of the electrical motor device 41. During automatic operation of the control system when it is desired to synchronize the speed of one engine with respect to the other, or in a system having more than two engines, to synchronize a plurality of engines with respect to the speed of one engine, each of the electric motor devices of the respective engines to be synchronized to a reference speed established by the reference or master engine is operated as a differential motor supplied by a pair of generators and is subjected to the effects of frequency difference or phase differences between these generators. For instance as shown in the two engine system of Fig. 1, if it is desired to synchronize the engine 11 with respect to the engine 10, the electric motor device 41 will be operated as a differential motor. One set of windings of the differential motor 41 is energized by an impulse generator 54, shown as a three-phase generator, driven at a speed bearing a direct relation to the speed of the engine 10 and its other set of windings is energized by a similar generator 55 driven by the engine 11 at a speed bearing a direct relation to the speed of the engine 11. As shown, I prefer to energize the stator winding 52 of the electric motor device 41 from its generator 55 while supplying the rotor winding 53 of the electric motor device 41 from the generator 54. Similarly, if the engine 10 is to be synchronized with reference to the engine 11, I prefer to supply the electric motor device 26 by energizing the stator winding 50 from the generator 54 and the rotor winding 51 from the generator 55.

The operation of the electric motor devices 26 and 41 as differential motors will become apparent from the description hereinafter, but at this point it may be well to understand that a "selector" switch 57 is provided to enable the operator to designate one or the other of the engines 10 and 11 as a master speed controlling engine. Also, a "manual-automatic" switch 58 is provided to enable the operator to make the final circuit connections after a particular engine has been designated as the master through the "selector" switch 57.

In addition to the automatic synchronizing of the engines 10 and 11, means are provided for effecting direct manual control of the speed of the engines 10 and 11, respectively, independently of the automatic or synchronizing control described in the foregoing. Such independent manual control is effected by converting the respective electric motor devices 26 and 41 to independent manually controlled motors through the operation of the respective "manual" switches 59 and 60. The "manual" control switch 59 may be used to control the operation of the electric motor device 26 as an independent manually controllable motor for adjusting the speed of the power plant 10 both when the synchronizing control system has been disconnected by turning the "manual-automatic" switch 58 to its "manual" position and when the synchronizing system is in operation but the "selector" switch 57 has been operated to the position 10 shown, thereby designating the engine 10 as the master engine. Similarly, the "manual" control switch 60 may be used to control the electric motor device 41 as an independent manually controllable motor both when the synchronizing system has been disconnected by turning the "manual-automatic" switch 58 to its "manual" position and when the synchronizing system is connected but the "selector" switch 57 has been turned to the position 11 shown by dotted lines, thereby designating engine 11 as the master engine.

With the above understanding of the elements included in this embodiment of my invention, the operation of the system itself and the manner in which automatic synchronizing control, independent manual control, selection or designation of a master and manual control of the engines is effected will be readily understood from the description which follows:

Assume now that the engines 10 and 11 are operating at speeds determined by their respective governors 14 and 15 and that their respective generators 54 and 55 are being correspondingly driven. Preferably, the generators 54 and 55 are multiphase alternating current generators having one phase grounded. In order to synchronize one engine with respect to the other, a suitable adjustment of its governor must be made. For instance, if it is desired to synchronize the engine 11 with respect to the engine 10, the governor 15 must be adjusted to change the speed of the engine 11 accordingly. To designate the engine 10 as the master engine which establishes the reference or synchronous speed, the "selector" switch 57 is operated to the position 10 shown. At this point, the circuits are merely preliminarily connected ready to operate the electric motor device 41 as a differential motor subjected to the effects of phase difference between the outputs of the generators 54 and 55 when the "manual-automatic" switch 58 is moved to its "automatic" position. The engine speeds determine the phase relation of the generators 54 and 55. If the speeds are the same, the generators will be in phase and no operation of the differential motor 41 will occur. Otherwise, the phase difference will cause the operation of the differential motor 41 until the governor 15 is appropriately adjusted to synchronize the engines 10 and 11 and their generators 54 and 55.

Upon selection of the engine 10 as a master engine by the "selector" switch 57, the "manual-automatic" switch 58 may be moved clockwise to its "automatic" position. Immediately the stator 52 of the electric motor device 41 is supplied with three-phase power from the generator 55 of the engine 11. A ground connection 62 serves to connect the right-hand brush of the generator 55 to the right-hand terminal of the stator 52 by conductor 63 connected to the ground 62. The middle brush of the generator 55 is connected to the middle terminal of the stator 52 in a circuit which includes from the generator a conductor 64, the normally-closed interlock contacts 65, the conductors 66 and 67 connected to the movable contact 68 of the "manual-automatic" switch 58, a fixed switch contact 69, a conductor 70, a fixed "selector" switch contact 71, a movable switch contact 72, a connection 73 and a movable switch contact 74, a fixed switch contact 75, the conductors 76 and 77 and through a conductor 78 to the middle terminal of the stator 52. As readily seen, the circuit just described from the generator 55 also serves to energize through the conductor 77 the middle winding of the clutch-operating solenoid 48, the right-hand winding of the clutch-operating solenoid 48 being energized from the ground connection 62. The left-hand terminal of the generator 55 is connected to the left-hand terminal of the stator 52 by a circuit which from the generator includes the conductors 79 and 80, the normally closed interlock contacts 81, the conductors 82 and 83, the movable and fixed switch contacts 84 and 85, a conductor 86, the fixed and movable switch contacts 87 and 88, a connection 89, the movable and fixed switch contacts 90 and 91, the conductors 92 and 93 and by a conductor 94 to the left-hand terminal of the stator 52. In addition, the above described circuit serves to energize the left-hand winding of the clutch solenoid 48 through the conductor 93. Thus it is seen that simultaneously with the energization of the stator 52 by the generator 55, the three-phase windings of the clutch solenoid 48 are also energized and the clutch 45 moved from its disengaged position shown to an engaged position for connecting the shafts 44 and 46.

The three-phase connection from the generator 54 to the rotor 53 of the electric motor device 41 is also made when the "manual-automatic" switch 58 is moved to its "automatic" position. The right-hand brush of the generator 54 is connected through its ground connection 62 to the ground point 62 of the electric motor device 41 and by a conductor 100 to the right-hand terminal of the rotor 53. The middle brush of the generator 54 is connected to the left-hand terminal of the rotor 53 by a circuit which from the generator includes a conductor 101, the normally-closed interlock contacts 102, the conductors 103 and 104, the fixed and movable switch contacts 105 and 106, a connection 107, the movable and fixed switch contacts 108 and 109, a conductor 110, the movable and fixed switch contacts 111 and 112 and by a conductor 113 to the left-hand terminal of the rotor 53. The left-hand brush of the generator 54 is connected to the middle terminal of the rotor 53 by a circuit which may be traced from the generator by a conductor 114, the normally-closed interlock contacts 115, the connectors 116 and 117, the fixed and movable switch contacts 118 and 119, a connection 120, the movable and fixed switch contacts 121 and 122, a conductor 123, the fixed and movable switch contacts 124 and 125 and by a conductor 126 through a conductor 127 to the middle terminal of the rotor 53.

In this manner, it is seen that the three windings of the clutch solenoid 48 are energized from the generator 55 to engage the clutch 45, and the electric motor device 41 is subjected to the effects of phase differences between the outputs of the generators 54 and 55 to operate as a differential motor for appropriately adjusting the governor 15 to maintain the engine 11 in synchronism with the engine 10. Depending upon the speed and phase relationship of the generators 54 and 55, the differential motor 41 will operate in one direction or the other to move the threaded member 19 and the adjusting rod 17 back or forth as required. As soon as the speeds of the engines 10 and 11 are in synchronism, the generators 54 and 55 will be in phase and the differential motor 41 will cease to operate; the synchronizing operation then being completed. Obviously any change in speed of the engine 10 relative to the engine 11, such as will occur if the speed of the engine 10 is manually adjusted in a manner described more fully hereinafter, will immediately effect operation of the differential motor 41 until the engine 11 is restored to synchronism with the engine 10.

If instead of designating the engine 10 as master engine, it is desired to select the engine 11 as the master engine for establishing the reference speed, this may be done by turning the "selector" switch 57 in a clockwise direction to point 11. Immediately then the electric motor device 41 drops out of circuit and the electric motor device 26 is connected in circuit and supplied on its stator 50 from its generator 54 and on its rotor 51 from the generator 55. The circuits from the generator 54 to the stator 50 of the electric motor device 26 may be traced as follows: The right-hand brush of the generator 54 is connected through the ground connections 62 by a conductor 130 to the right-hand terminal of the stator 50. The middle brush of the generator 54 is connected to the middle terminal of the stator 50 by a circuit which from the generator includes the conductor 101, the normally-closed interlock contacts 102, the conductors 103 and 131, the movable and fixed switch contacts 132 and 133, a conductor 134, the fixed and movable contacts 135 and 72, the connection 73, the movable and fixed contacts 74 and 136 and by the conductors 137 and 138 through the conductor 139 to the middle terminal of the stator 50. The left-hand brush of the generator 54 is connected to the left-hand terminal of stator 50 by a circuit which includes from the generator the conductor 114, the normally closed interlock contacts 115, the conductors 116 and 140, the movable and fixed switch contacts 141 and 142, a conductor 143, the fixed and movable contacts 144 and 88, the connection 89, the movable and fixed contacts 90 and 145 and by the conductors 146 and 147 through a conductor 148 to the left-hand terminal of the stator 50. Also, it should now be apparent that the three coils of the clutch operating solenoid 39 have been energized from the generator 54 through the ground connection 62, and the live leads 138 and 147 respectively.

The generator 55 is now also connected to the rotor 51 of the electric motor device 26. The right-hand brush of the generator 55 is connected through the ground connections 62 and a conductor 150 to the right-hand terminal of the rotor 51. The middle brush of the generator 55 is connected to the left-hand terminal of the rotor 51 by a circuit which includes from the generator the conductor 64, the normally-closed interlock contacts 65, the conductor 66, the fixed and movable switch contacts 151 and 106, the connection 107, the movable and fixed contacts 108 and 152, a conductor 153, the movable and fixed contacts 154 and 155 and by a conductor 156 to the left-hand terminal of the rotor 51. The left-hand brush of the generator 55 is connected to the middle terminal of the stator 51 by a circuit which includes from the generator the conductors 79 and 80, the normally-closed interlock contacts 81, the conductor 82, the fixed and movable switch contacts 157 and 119, the connection 120, the movable and fixed switch contacts 121 and 158, a conductor 159, the movable and fixed switch contacts 160 and 161 and by a conductor 162 to the middle terminal of the rotor 51.

Since the energization of the windings of the clutch-operating solenoid 39 will cause the clutch member 33 to move to a position of engagement for connecting the shafts 31 and 34, it is apparent that appropriate adjustment of the governor 14 for regulating the speed of the engine 10 will occur when the electric motor device 26 is operated as a differential motor subjected to the effects of phase differences between the outputs of the generators 54 and 55 in a manner similar to that described in connection with the electric motor device 41. Thus, the engine 10 will always be maintained in synchronism with the engine 11 even though the speed of the engine 11 is varied manually in a manner to be described more fully hereinafter. Also it should now be apparent that the "selector" switch 57 enables the operator to appoint either one of the engines as a master engine and then the closing of the "manual-automatic" switch 58 completes the circuit to effect this synchronizing control as described above.

It has been noted that when either of the engines is designated as a master through manipulation of the "selector" switch 57, the master engine's respective electric motor device is disconnected and becomes inoperative. However, either of the electric motor devices 26 and 41 may be operated as manually controlled motors controllable independently of the synchronizing system. To this end, I have provided the "manual" switch 59 for independent manual control of the electric motor device 26 as an independent manually controlled reversing motor, and I have provided the "manual" switch 60 to enable operation of the electric motor device 41 as an independent manually controllable reversing motor. For instance, if the engine 10 has been designated as the master engine, the then normally deenergized electric motor device 26, that is, deenergized with respect to the synchronizing control system, may itself be operated as a reversing motor to control the setting of the governor 14 and thereby the speed of the engine 10. Naturally, if the synchronizing control system is in operation, the change in speed of the engine 10 will be reflected in a similar change in speed in the engine 11 through the operation of the electric motor device 41. Independent manual control of the electric motor device 26 as a reversing motor is effected by moving the "manual" switch 59 up or down to operate the electric motor device 26 forward or backward to effect the desired control on the governor 14 and engine 10. For this independent manual operation of the electric motor device as a reversing motor, I prefer to energize the stator 50 directly from the generator 54 and simultaneously short circuit one or more windings of the rotor 51 to convert the electric motor device 26 from a motor that is operable in the synchronizing system as a differential motor, to a short-circuited rotor induction motor. If desired, the electric motor device 26 may be energized in other ways in a manner whereby what is here termed as "independent manual control" of this motor may be achieved, and, therefore, I do not wish to be limited to the preferred form described.

Either with the engine 10 operating as the master engine as described in the foregoing or with the synchronizing system disconnected by movement of the switch 58 to its manual position, the "manual" switch 59 may be actuated from its "off" or mid-position shown to energize the electric motor device 26 by connecting the circuits across the respective "down" contacts 170, 171 and 172 or the respective "up" contacts 173, 174 and 175. Assuming for instance, that the "down" contacts 170, 171 and 172 are closed, the electric motor device 26 will then be energized to operate as an independent manually controlled reversible motor for operation in a given direction to accordingly adjust the governor 14 by moving the translatable adjusting rod 18. The three phases of the stator 50 are connected to suitable electric supply connections as shown the generator 54 as follows: The left-hand brush of the generator 54 is connected to the middle terminal of the stator 50 by a circuit which from the generator includes the conductor 114, the normally-closed interlock contacts 115, the conductor 116, the "down" contacts 172 and by the conductor 138 through the conductor 139 to the middle terminal of the stator 50. The middle brush of the generator 54 is connected to the left-hand terminal of the stator 50 by a circuit which from the generator includes the conductor 101, the normally-closed interlock contacts 102, the conductor 103, the "down" contacts 171 and by the conductor 147 through the conductor 148 to the left-hand terminal of the stator 50. The right-hand brush of the generator 54 is connected to the right-hand terminal of the stator 50 through the ground connections 62 and the conductor 130. Simultaneously with the closure of the "down" contacts 171 and 172 which cause energization of the stator 50 from the generator 54, the "down" contacts 170 are closed to short circuit one or more of the windings of the rotor 51. This short circuit may be traced from the ground connection 62 adjacent the rotor 51 through the conductor 150 to the rotor, through the rotor windings and out from the middle terminal of the rotor by the conductors 162 and 177, the "down" contacts 170 and the conductors 178 and 179 to another ground connection 62.

If the "manual" switch 59 is actuated to close the "up" contacts 173, 174 and 175, it should be apparent that closure of the "up" contact 173 again short circuits the rotor 51 through ground by the same circuit just described. Closure of the "up" contacts 174 connects the left-hand brush of the generator 54 to the left-hand terminal of the stator 50 by a circuit which from the generator includes the conductor 114, the normally-closed interlock contacts 115, the conductor 116, the "up" contacts 174 and by the conductors 147 and 148 to the left-hand terminal of the stator 50. The middle brush of the generator 54 is now connected to the middle terminal of the stator 50 by a circuit which from the generator includes the conductor 101, the normally-closed interlock contacts 102, the conductor 103, the "up" contacts 175, the conductor 138, and through the conductor 139 to the middle terminal of the stator 50. The right-hand terminal of the stator 50 is again energized through the conductor 130 and the ground connections 62 from the right-hand brush of the generator 54. Thus it appears that the "manual" switch 59 in the "down" position will cause operation of the electric motor device 26 in one direction as an independent manually controlled induction motor while in the "up" position, by reversing two leads from the generator 54, will cause operation of the electric motor device 26 in the other direction also as an independent manually controlled induction motor. Simultaneously with the energization of the stator 50 from the generator 54, the three windings of the clutch operating solenoid are energized from the live leads 138 and 147 and by the ground connection 62 to cause the clutch 33 to engage. In this manner the motor forces of the electric motor device 26 are applied through the engaged clutch 33 to move the translatable adjusting rods 16 for setting the governor 14.

Similarly, with the engine 11 operating as the master engine as described in the foregoing or with the synchronizing system disconnected, the "manual" switch 60 may be actuated from its "off" or mid-position shown to energize the electric motor device 41 to complete the circuits across the respective "down" contacts 180, 181 and 182 or the respective "up" contacts 183, 184 and 185. In this instance, the windings of the rotor 53 are short circuited by closure of the respective "down" contacts 180 or "up" contacts 183 in a circuit which may be traced from the middle terminal of the rotor 53 through the conductor 127, the respective "down" or "up" contacts 180 and 183, a conductor 186 and through the ground connections 62 and the conductor 100 to the right-hand terminal of the rotor 53. Also, the stator 52 is supplied through the respective "down" contacts 181 and 182 or the respective "up" contacts 184 or 185 and the ground connections 62 with three phase power from suitable electric supply connections as shown from the generator 54 in circuits including the interlock contacts 65 and 81 similar to those described in connection with the electric motor device 26. In this manner the electric motor device 41 is convertible to an independent manually controlled reversing motor for adjusting the setting of the governor 15, the driving connection being made by operation of the clutch 45 to its engaged position upon energization of the windings of the solenoid 48 which also receive power from the generator 55 upon operation of the "manual" switch 60.

If the manual-automatic switch 58 is moved to its manual position to disable the synchronizing system by disconnecting the electric motor device 26 or 41 from the generator 54 or 55, as the case may be, then either or both of the electric motor devices 26 and 41 is operable as a manually controlled reversing motor for independently controlling the setting of its respective governor 14 or 15. Thus with the switch 58 in this manual position and the devices 26 and 41 thus disconnected from the synchronizing system, the device 26 may be operated as a motor in either direction as previously described by moving the switch 59 from its mid-position shown in the drawing to its upper position or to its lower position depending upon the direction of rotation desired. This short circuits one winding of the device 26 and connects the device 26 for operation as a motor to the generator 54, the engine 10 of course being assumed to be running.

In a similar manner, operation of the switch 60 from the mid-position shown to its upper or lower position as previously described connects the device 41 to the generator 54 for operation as a motor in either direction depending upon the direction of movement of the switch 60 whereby the governor 15 may be adjusted as desired by manual control.

Also, as previously described in detail, when the engine 10 is operated as a master speed control engine, the switch 57 being thrown to the position required for operation of the engine 10 as a master, the device 26 is not electrically connected with the synchronizing system and can be operated at that time as a motor by means of the switch 59 to adjust the speed of the master engine 10. Likewise, as previously described, when the engine 11 is operating as a master speed control engine, the switch 57 being thrown to establish the required synchronizing connections, the motor device 41 is not connected with the synchronizing system and can be operated as a reversing motor by means of the manual switch 60 to adjust the speed of the master engine 11. In each case, when the speed of the master engine is adjusted, the speed of the other engine is automatically given a corresponding adjustment through the synchronizing system.

As illustrated in Fig. 2, special interlocking means are provided to ensure the correct operation of the switches 59 and 60 dependent upon the relative positions of the switches 57 and 58. As shown, the interlocking means comprises the crank arms 190 and 191 which are respectively secured to the switches 57 and 58 for rotation therewith when either of these switches is operated. The crank arm 190 is connected to an elongated cam arm 193 by a pin 194 loosely fitted in a notch at the right-hand end of the cam arm 193. Similarly, the crank arm 191 is connected to a cam arm 195 by a pin 196 loosely fitted in a notch in the left-hand end of the cam arm 195. The cam arms 193 and 195 extend toward each other and are held in side-by-side sliding relationship by the pins 197 which fit into elongated slots 198 in these arms. Each of the cam arms 193 and 195 is provided with a pair of spaced-apart cam projections 199 and 200, and 201 and 202. Locking means are provided for each of the "manual" switches 59 and 60 and comprise the respective pivoted members 203 and 204 which are provided at their upper ends with the rollers 205 and 206 and at their lower ends with the pins 207 and 208. As shown, the locking member 204 is in its locking position, its pin 208 engaging a recessed portion of the "manual" switch 60 to hold this switch in its neutral position. The locking arm 203 which has been moved counterclockwise by the cam surface 199 of the cam arm 193 is shown in its unlocked position with its pin 207 out of engagement with the "manual" switch 59. Each of the locking arms 203 and 204 is biased by a spring 209 to the locking position.

As illustrated, the crank arm 191 which is connected to the "manual-automatic" switch 58 has been moved with this switch to the "automatic" position and the crank arm 190 which is connected to the "selector" switch 57 has been moved to the position 10 wherein the engine 10 is designated as a master engine. With the synchronizing system connected and the engine 10 operating as a master, it is desirable that the operation of the electric motor device 41 as a differential motor in the synchronizing operation not be inadvertently interfered with. To this end, it is necessary to lock the "manual" switch 60 in its neutral position and prevent this switch from being accidentally actuated to one of its operated positions. As shown, the locking arm 204 and its pin 208 perform this service. Meanwhile the "manual" switch 59 is free for actuation should the operator desire to convert the electric motor device 26 to an independent manually controlled motor for controlling the setting of the governor 14 on the master engine 10. If the "selector" switch 57 is moved clockwise to its "selector" position 11, the cam face 199 will be moved to the right out of contact with the roller 205 of the locking arm 203 and immediately the spring 209 will rotate this locking arm in a counterclockwise direction to its locking position to prevent actuation of the "manual" switch 59. Simultaneously the cam face 200 will be moved to the right into engagement with the roller 206 of the locking arm 204. The resulting clockwise rotation of the locking arm 204 to its unlocked position leaves the "manual" switch 60 free for actuation. Should it be desired to discontinue the synchronous control by moving the "manual-automatic" switch 58 to its "manual" position, it should now be apparent that the crank arm 191 will be moved in a counterclockwise direction to move the cam projections 201 and 202 to the left and into contact with the respective rollers 205 and 206 to cause clockwise rotation of the locking arms 203 and 204. Thereupon, these locking arms are moved to their unlocked position, and then the "manual" switches 59 and 60 may be freely operated.

Operation of either of the electric motor devices 26 and 41 as independent manually controlled motors is generally performed by notching the respective "manual" switches 59 and 60 "on" and "off" until the respective governors 14 and 15 are adjusted to the desired position. To prevent over-control of either of the governors 14 and 15 and thereby prevent over-speeding or under-speeding of the engines 10 and 11, I have provided means establishing predetermined limits of operation of the electric motor devices either when these devices are operated as independent manually controlled motors or as differential motors during synchronous control. In addition, I have provided indicating means by which the operator may be informed should over-control or excessive operation of either or both of the electric motor devices 26 and 41 occur accidentally or by improper operation. In short, a separate control limiting means and indicating means is provided for each of the electric motor devices 26 and 41. Should predetermined limits of control operation of either of these devices occur, that fact is suitably indicated and the offending electric motor device automatically disconnected both by disengaging its clutch and by wholly or partially deenergizing the electric motor device itself.

Suitable limit switches 211 and 212 are provided for operation by the translatable gear 22 so that if the threaded member 18 is moved too far forward the gear 22 will engage and close the limit switch 211 or if the threaded member 18 is moved too far backward, the gear 22 will engage and close the limit switch 212. The limit switches 211 and 212 are both connected to close a circuit which energizes a relay 215 to open the normally closed interlock contacts 102 and 115. The circuit for the limit switch 211 may be traced from the right-hand brush of the generator 54 through the ground connections 62, the limit switch 211, a conductor 213, the normally-closed switch contacts 214 and through the energizing winding of the relay 215 and the conductor 114 to the left-hand brush of the generator 54. Similarly the limit switch 212 is in a circuit which extends from the right-hand brush of the generator 54 to the ground connections 62, the limit switch 212, a conductor 216, the normally-closed contacts 217 and through the energizing winding of the relay 215 and the conductor 114 to the left-hand brush of the generator 54.

During normal operation of the electric motor device 26 as a differential motor in synchronizing control, it will be remembered that the stator 50 is energized by the generator 54 through the normally-closed interlock contacts 102 and 115 of the relay 215. Should for some reason the operation of the differential motor 26 move the gear 22 beyond its normal operating limits and into engagement with either of the limit switches 211 and 212, it is apparent that the energizing winding of the relay 215 will be energized through the short circuit established from the left-hand brush of the generator 54 through the limit switches to the right-hand brush of the generator 54. The relay 215 will then pick up to open the normally-closed interlock contacts 102 and 115, thereby disconnecting the generator 54 from the stator 50 of the differential motor 26 and cause the motor to cease operation. Simultaneously also, opening of the interlock contacts 102 and 115 will serve to deenergize the windings of the clutch operating solenoid 39 for disengaging the clutch 33. Obviously then, further adjustment of the governor 14 will cease, its position being held by the braking action of the disengaged clutch member 33 against the fixed member 36. Simultaneously with the deenergization of the stator 50 and the disengagement of the clutch 33, the normally-closed contacts 218 will be engaged to energize and light a signal lamp 219 which indicates to the operator the fact that the electric motor device 26 has exceeded its control limits. The circuit for the indicating lamp 219 traced from the middle brush of the generator 54 includes the conductor 101, a conductor 220, the contacts 218, a conductor 221, a limiting resistance 222, the indicating lamp 219, the conductor 179 and through the ground connections 62 to the right-hand brush of the generator 54.

Since the signal light 219 indicates that the electric motor device 26 has exceeded its control limits, steps may be taken to correct this condition by turning the "manual-automatic" switch 58 to its "manual" position for disconnecting the synchronizing system. The electric motor device 26 may then be operated as an independent manually controlled reversing motor through the "manual" switch 59 as previously described. That is, the electric motor device 26 may be operated in such a manner as is necessary to bring the governor 14 back within its predetermined control limits. To assure that the electric motor device 26 is operated in the correct direction to return the governor setting within the predetermined limits, means are provided to prevent operation of the electric motor device 26 in what might be termed the wrong direction or the direction which would tend to carry the governor setting further outside of the control limits.

By referring to Fig. 1, it is seen that the normally closed contacts 214 and 217 which are in circuit with the winding of the relay 215 are operated respectively by the "up-down" movements of the "manual" switch 59. To get operation of the electric motor device through the "up-down" contacts of the "manual" switch 59, it is necessary that the energizing winding of the relay 215 first be deenergized to close again the interlock contacts 102 and 215 which were opened by this relay. The normally-closed contacts 214 suitably are arranged for operation to the open position only when the "manual" switch 59 is moved to its "up" position. Similarly, the normally-closed contacts 217 suitably are arranged for operation to the open position only when the "manual" switch 59 is operated to its "down" position. In this way, if the "manual" switch 59 is operated to the "down" position when the limit switch 211 is closed, the energizing winding of the relay 215 will continue to be energized through the normally-closed contacts 214, and independent manual control of the electric motor device 26 in the wrong direction is prevented since the main interlock contacts 102 and 115 remain open. However, if the "manual" switch 59 is moved to the "up" position, that is, correctly actuated to operate the electric motor device 26 in a direction to return the governor within its predetermined control limits, then the normally-closed contacts 214 will be opened for deenergizing the relay 215, thereby permitting the main interlock contacts 102 and 115 to close and complete the independent manual control circuits from the generator 54 to the electric motor device 26. Thus, it is seen that operation of the electric motor device 26 in the correct direction is arbitrarily assured. As soon as the gear 22 is moved back to its proper position, the limit switch may be arranged to resume its normal open position by spring means or the like.

In a somewhat similar manner, if the electric motor device is operated as an independent manually controlled motor and is accidentally over-operated to adjust the governor 14 beyond its predetermined control limits, one of the limit switches 211 or 212 again closes the energizing circuit for the relay 215. Immediately the main interlock contacts 102 and 115 are opened and the motor 26 as well as the clutch-operating solenoid 39 are deenergized. Thus, further operation of the motor 26 in the direction it had then been proceeding is denied and only opposite operation of this motor sufficient to return the governor 14 within its predetermined control limits may be had. This latter is true because of the necessity of breaking the energizing circuit of the relay 215 through the proper one of the normally-closed contacts 214 and 217 depending upon which of the limit switches 211 or 212 was closed.

From the description above, it is now thought that the operation of the limit switches 231 and 232 for the electric motor device 41 should be readily apparent. These limit switches correspond exactly in function and operation to the limit switches 211 and 212 of the electric motor device 26. In short, closure of either of the limit switches 231 or 232 energizes a signal lamp 233 which indicates to the operator that the governor 15 has been over-controlled. Simultaneously a relay 234 is energized and the main interlock contacts 65 and 81 of the generator 55 opened. This has the effect of deenergizing the clutch-operating solenoid 46 as well as disconnecting the circuits from the generator 55 to the stator 52 of the electric motor device 41. The setting of the governor 15 is then maintained by the braking effect of the deenergized or disconnected clutch 45. When it is desired to return the governor setting back within its predetermined control limits, this may be done by operating the electric motor device 41 as an independent manually controlled motor through the manipulation of the "manual" switch 60 which again is only effective to operate the electric motor device in the correct direction. This is true since the proper one of the normally-closed contacts 235 and 236 which are connected for actuation with the "manual" switch 60 must be opened to deenergize the relay 234 for again permitting the main interlock contacts 65 and 81 to close. Thus, as before, correct operation of the electric motor device in the right direction is arbitrarily assured.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. A speed and synchronizing control system for a power plant comprising speed controlling means for said power plant, an impulse generator driven by said power plant, means including a reference impulse generator for establishing a reference speed, an electric motor device operatively connected to operate said speed controlling means, said electric motor device being provided with a stator winding and with a rotor winding, switching means for connecting said stator and rotor windings respectively to said generators so that the rotor of said motor device turns in accordance with the difference between the speeds of said generators and operates said speed controlling means to maintain the speed of said power plant in a predetermined relation with the speed of said reference generator, electric supply connections, and a second switching means for connecting one of said windings to said supply connections and providing a closed circuit for the other of said windings to effect operation of said motor device as an induction motor to operate said speed controlling means and change the speed of said power plant.

2. A speed and synchronizing control system for a power plant comprising speed controlling means for said power plant, a polyphase alternating current generator driven by said power plant, means including a reference polyphase generator for establishing a reference speed, an electric motor device operatively connected to operate said speed controlling means, said electric motor device being provided with a poly-circuit stator winding and with a poly-circuit rotor winding, switching means for connecting said stator and rotor windings respectively to said generators whereby the rotor of said motor device turns in accordance with the difference between the speeds of said generators and operates said speed controlling means to maintain the speed of said power plant in a predetermined relation with the speed of said reference generator, electric supply connections, and manually operated switching means for short circuiting one of said windings of said motor device and for connecting the other winding of said motor device to said supply connections for operation of said motor device as a manually controlled motor to operate said speed controlling means and change the speed of said power plant.

3. A speed and synchronizing control system for a power plant comprising speed controlling means for said power plant, a polyphase alternating current generator driven by said power plant, means including a reference polyphase generator for establishing a reference speed, an electric motor device operatively connected to operate said speed controlling means, said electric motor device being provided with a poly-circuit stator winding and with a poly-circuit rotor winding, switching means for connecting said stator and rotor windings respectively to said generators whereby the rotor of said motor device turns in accordance with the difference between the speeds of said generators and operates said speed controlling means to maintain the speed of said power plant in a predetermined relation with the speed of said reference generator, and a second switching means for connecting one of said windings to one of said generators for operation of said motor device as an induction motor to operate said speed controlling means and change the speed of said power plant.

4. A speed and synchronizing control system for a power plant comprising an adjustable speed controlling means for said power plant, an electric generator driven by said power plant, means including a reference generator for establishing a reference speed, an electric motor device arranged to be operatively connected for adjusting said speed controlling means of said power plant, said electric motor device having separately energizable stator and rotor windings, means for subjecting said electric motor device to the effects of phase differences between the outputs of said first-mentioned generator and said reference speed generator and for operating said electric motor device as a differential motor thereby to control the speed of said power plant with respect to said reference speed, and switching means for energizing said stator windings of said electric motor device from said first-mentioned generator and short-circuiting said rotor windings for converting said electric motor device to an induction motor to enable independent manual control of said power plant.

5. A speed and synchronizing control system for a power plant comprising an adjustable speed controlling means for said power plant, an electric generator driven by said power plant, means including a reference generator for establishing a reference speed, an electric motor device arranged to be operatively connected for adjusting said speed controlling means of said power plant, said electric motor device having separately energizable stator and rotor windings, means for subjecting said windings to the effects of phase differences between the outputs of said first-mentioned generator and said reference speed generator for operation of said electric motor device as an electric differential motor thereby to control the speed of said power plant with respect to said reference speed, switching means for manually controlling the energization of said windings for operation of said electric motor device as a motor to effect speed control of said power plant independently of the relative speeds of said generators, and means establishing predetermined limits of operation for said electric motor device either when said electric motor device is operating as a differential motor or as an independent manually controlled electric motor whereby predetermined overspeed and underspeed adjustment of said power plant is avoided.

6. A speed and synchronizing control system for a power plant comprising an adjustable speed controlling means for said power plant, an electric generator driven by said power plant, means including a reference generator for establishing a reference speed, an electric motor device arranged to be operatively connected for adjusting said speed controlling means of said power plant, said electric motor device having separately energizable stator and rotor windings, means for subjecting said electric motor device to the effect of phase differences between the outputs of said first-mentioned generator and said reference speed generator and for operating said electric motor device as a differential motor thereby to control the speed of said power plant with respect to said reference speed, switching means for short-circuiting a predetermined one of said windings and for energizing the other of said windings from a predetermined one of said generators to effect independent manual control of said electric motor device and thereby speed control of said power plant independently of the relative speeds of said generators, and means establishing predetermined limits of operation for said electric motor device by interrupting the energization of said electric motor device from said predetermined one of said generators for preventing predetermined overspeed and underspeed adjustment of said power plant.

7. In a multiple power plant speed and synchronizing control system in which each power plant is provided with a speed controlling means, the combination of an electric motor device for operating each of said speed controlling means, each of said motor devices being provided with a stator winding and a rotor winding, an impulse current generator driven by each of said power plants, switching means for connecting one of said windings of each of said motor devices to one of said generators and for short-circuiting the other of said windings to provide for operation as an electric induction motor to operate its speed controlling means, and a second switching means for connecting the windings of one of said motor devices respectively to the generator driven by its power plant and to a predetermined other one of said generators for operation as an electric differential device to maintain the speed of its power plant in a predetermined relation with the speed of the power plant driving said predetermined generator.

8. In a multiple power plant speed and synchronizing control system in which each power plant is provided with an adjustable speed governing means, the combination of an electric motor device for adjusting each of said governing means, said motor devices being each provided with a poly-circuit stator winding and with a poly-circuit rotor winding, a polyphase generator driven by each power plant, switching means for connecting the windings of one of said motor devices respectively to the generator driven by its power plant and to a predetermined other one of said generators for operation of said motor device as an electric differential to control the speed of its power plant in a predetermined relation with the speed of the power plant driving said predetermined generator, a second switching means for energizing one of said windings of each of said electric motor devices for operation of each of said motor devices as an electric motor to effect control of the speed of the power plant controlled by said motor device independently of any other of said power plants, and limit switch control means for each of said electric motor devices operated by a predetermined operation of each motor device in each direction thereby to preclude predetermined overspeed and underspeed adjustment of the respective power plants.

9. In a multiple power plant speed and synchronizing control system in which each power plant is equipped with an adjustable speed controlling means, the combination including an electric motor for adjusting each of said speed controlling means, a generator driven by each power plant, means including a switch for interconnecting said generators and said electric motors to establish one of said power plants as a master power plant and automatically to synchronize the speeds of the remaining power plants with the speed of said master power plant for effecting automatic control of said power plants, switching means for individually controlling the operation of each of said electric motors as an independent manually controlled electric motor for effecting manual control of its respective one of said speed controlling means independently of said synchronizing means, limit means establishing predetermined control limits for said electric motors to prevent excessive control operation thereof and thereby preclude predetermined overspeed and underspeed adjustment of the respective power plants, said individual switching means enabling return operation of said electric motors back within said predetermined control limits after operation of said limit means, and means disabling said individual switching means for effecting operation of said electric motors other than in a proper return direction after said predetermined control limits have been exceeded.

10. In a multiple power plant speed and synchronizing control system in which each power plant is equipped with an adjustable speed controlling means, the combination including an electric motor device for adjusting each of said speed controlling means, an electric generator driven by each power plant, switching means including a plurality of "manual" switches for individually controlling the operation of each of said electric motor devices as a manually controlled electric motor for effecting independent manual control of said power plants, means including a "manual-automatic" switch for interconnecting said generators and said electric motor devices to establish one of said power plants as a master power plant and automatically to synchronize the speeds of the remaining power plants with the speed of said master power plant for effecting automatic control of said power plants, means including a selector switch for selecting a predetermined one of said power plants as the master power plant subject to independent manual control by its respective electric motor device through said individual switching means, and interlocking means operatively connecting said switches for locking predetermined ones of said "manual" switches in an "off" position during automatic synchronizing control and for simultaneously maintaining the "manual" switch free for operation.

11. A speed and synchronizing control system for a power plant comprising an adjustable speed controlling means for said power plant, an electric generator driven by said power plant, means including a reference generator for establishing a reference speed, an electric motor device arranged to be operatively connected for adjusting said speed controlling means of said power plant, switching means for subjecting said electric motor device to the effects of phase differences between the outputs of said first-mentioned generator and said reference speed generator and for operating said electric motor device as a differential motor thereby to control the speed of said power plant with respect to said reference speed, "manual" switching means for converting said electric motor device to an induction motor to enable independent manual control of said power plant without regard to the relative speeds of said generators, and interlocking means operatively connecting said switching means to prevent manipulation of said "manual" switching means during differential operation of said electric motor device.

12. In a multiple power plant speed and synchronizing control system in which each power plant is equipped with an adjustable speed controlling means, the combination including an electric motor device for adjusting each of said speed controlling means, a generator driven by each power plant, means including a plurality of "manual" switches for individually controlling the operation of each of said electric motor devices as an independent manually controlled electric motor for effecting manual control of said power plants, means including a "manual-automatic" switch for interconnecting said generators and said electric motor devices to establish one of said power plants as a master power plant and automatically to synchronize the speeds of the remaining power plants with the speed of said master power plant for effecting automatic control of said power plant, limit means establishing predetermined control limits for said electric motor devices to prevent excessive control operation thereof and thereby preclude predetermined overspeed and underspeed adjustment of the respective power plants, and interlocking means operatively connecting said switches arranged to prevent manipulation of predetermined ones of said "manual" switches when said "manual-automatic" switch is in its automatic position.

13. In a multiple power plant speed and synchronizing control system in which each power plant is equipped with an adjustable speed controlling means, the combination including an electric motor device for adjusting each of said speed controlling means, a generator driven by each power plant, switching means for individually controlling the operation of each of said electric motor devices as an independent manually controlled electric motor for effecting manual control of said power plants, means including a switch for interconnecting said generators and said electric motor devices to establish one of said power plants as a master power plant and automatically to synchronize the speeds of the remaining power plants with the speed of said master power plant for effecting automatic control of said power plant, limit means establishing predetermined control limits for said electric motor devices to prevent excessive control operation thereof and thereby preclude predetermined overspeed and underspeed adjustment of the respective power plants, said individual switching means enabling return operation of said electric motor devices back within said predetermined control limits after operation of said limit means, means disabling said individual switching means from effecting operation of said electric motor devices other than in a proper return direction after said predetermined control limits have been exceeded, and interlocking means operatively connecting said individual switching means and said switch for predetermining the operability of said individual switching means relative to the position of said switch.

LAURENS A. TAYLOR.